United States Patent
Goddard et al.

(10) Patent No.: US 8,538,796 B2
(45) Date of Patent: Sep. 17, 2013

(54) METHOD FOR MEASURING AND IMPROVING ORGANIZATION EFFECTIVENESS

(75) Inventors: Laurence V. Goddard, Shaker Heights, OH (US); Mark D. Kozel, Mentor, OH (US); Daniel B. Kiehl, Copley, OH (US); David Cesar, East Highland Heights, OH (US); Jennifer D. Rote, Shaker Heights, OH (US); Rita Sherwood Dawson, Pepper Pike, OH (US)

(73) Assignee: The Parkland Group, Inc., Cleveland, OH (US)

( * ) Notice: Subject to any disclaimer, the term of this patent is extended or adjusted under 35 U.S.C. 154(b) by 2360 days.

(21) Appl. No.: 11/467,177

(22) Filed: Aug. 25, 2006

(65) Prior Publication Data

US 2007/0250360 A1 Oct. 25, 2007

Related U.S. Application Data

(60) Provisional application No. 60/793,571, filed on Apr. 20, 2006.

(51) Int. Cl.
G06Q 10/00 (2012.01)

(52) U.S. Cl.
USPC .......................................................... 705/7.36

(58) Field of Classification Search
None
See application file for complete search history.

(56) References Cited

U.S. PATENT DOCUMENTS

| | | | |
|---|---|---|---|
| 5,365,425 A | 11/1994 | Torma et al. | |
| 5,684,964 A | 11/1997 | Powers et al. | |
| 5,737,494 A | 4/1998 | Guinta et al. | |
| 6,007,340 A | 12/1999 | Morrel-Samuels | |
| 6,556,974 B1 | 4/2003 | D'Alessandro | |
| 6,574,621 B1 | 6/2003 | Lautzenheiser et al. | |
| 6,614,451 B1 * | 9/2003 | Hudson et al. | 715/759 |
| 6,877,034 B1 | 4/2005 | Machin et al. | |
| 2002/0147626 A1 | 10/2002 | Zagotta et al. | |
| 2002/0156649 A1 | 10/2002 | Edgar | |
| 2003/0061141 A1 | 3/2003 | D'Alessandro | |
| 2003/0229558 A1 | 12/2003 | Kobayashi et al. | |
| 2004/0044552 A1 | 3/2004 | Marwood | |
| 2004/0068431 A1 | 4/2004 | Smith et al. | |
| 2004/0186765 A1 | 9/2004 | Kataoka | |
| 2005/0049911 A1 * | 3/2005 | Engelking et al. | 705/11 |
| 2005/0065904 A1 | 3/2005 | DeAngelis et al. | |

OTHER PUBLICATIONS

More about Manufacturing PROBE, CBI The Voice of Business, archived on archive.org Oct. 13, 2004.

* cited by examiner

*Primary Examiner* — Jonathan G Sterrett
(74) *Attorney, Agent, or Firm* — Hahn Loeser & Parks, LLP

(57) ABSTRACT

A method of evaluating the effectiveness of an organization. The method includes participants generating responses to a set of organizational statements as part of a one-day event. The participants are able to interact with each other during various phases of the one-day event in order to generate responses. The responses are entered into a software program running on a computer-based platform, and the software program operates on the responses to generate output results (evaluation results . . . e.g., scores associated with various organizational categories) as part of the one-day event. The results may be used to measure and benchmark effectiveness of the organization and to formulate suggestions and actions to be taken by the organization to improve the effectiveness of the organization.

31 Claims, 4 Drawing Sheets

FIG. 2

| | 201 STRATEGY & VISION | 202 ORGANIZATION & CULTURE | 203 ACCOUNTING & FINANCE | 204 RESPONSIVENESS & EXECUTION |
|---|---|---|---|---|
| 1 | CURRENT VISION & STRATEGIC PLAN 205<br>CURR. VISION & STRAT. PLAN<br>BUY-IN<br>CUSTOMER INPUT<br>FOCUS | WORK ENVIRONMENT 225<br>COMMUNICATIONS<br>LEADERSHIP<br>PHYSICAL ENVIRONMENT | ACCOUNTING & CASH 245<br>FINANCIAL STATEMENTS<br>BUDGET VARIANCES<br>PROJECTIONS<br>CAPITAL & CASH<br>COVENANTS | RESPONSIVENESS 265<br>DELIVERY AND FILL<br>RESOLVING ISSUES<br>CUSTOMER INVOLVEMENT<br>RELATIONSHIP W. CUSTS. |
| 2 | DOWNHILL RIDES 210<br>MARKET GROWTH<br>MARKET LEVERAGE<br>MARKET STABILITY<br>MARGINS | EMPOWERMENT, TEAMWORK & CULTURE 230<br>EMPLOYEE INPUT<br>TEAMS<br>EMPOWERMENT<br>CULTURE | COSTING 250<br>COSTING SYSTEM<br>BILLS OF MATERIAL<br>COST VARIANCES<br>BREAK-EVEN/CONTRIB. LEVELS | IMPLEMENTATION OF PLANNING & GOALS 270<br>GOALS & PLANNING<br>EXECUTION<br>KPIS |
| 3 | REASONS TO THRIVE 215<br>PRICING<br>CUSTOMER SERVICE<br>QUALITY<br>TECHNOLOGY & INNOVATION<br>EASE OF DOING BUSINESS<br>INTANGIBLES | EFFECTIVE HIRING, TRAINING & DEVELOPMENT 235<br>HIRING<br>TRAINING<br>CROSS-TRAINING<br>EMPLOYEE TURNOVER<br>SUCCESSION PLANNING | FINANCIAL MANAGEMENT 255<br>CREDIT & COLLECTION<br>DSO<br>INVENTORY<br>FIXED ASSETS | CONTINUOUS IMPROVEMENT/LEAN 275<br>LEAN<br>SCHEDULING AND FLOW<br>QUALITY<br>SUPPLIER ACCOUNTABILITY<br>CONTROLLING COSTS<br>LOGISTICS |
| 4 | SEGMENT FOCUS 220<br>ANALYZE & ACT<br>SALES STRATEGY<br>GROWTH STRATEGY<br>PROTECTION STRATEGY<br>MARKET SHARE | PERFORMANCE APPRAISAL & ACCOUNTABILITY 240<br>APPRAISAL SYSTEM<br>ACCOUNTABILITY<br>FINANCIAL LINK | SYSTEMS & CONTROLS 260<br>IT<br>INTERNAL CONTROLS<br>RISK MANAGEMENT<br>SAFETY | SALES & MARKETING 280<br>VALUE PROPOSITION<br>PRODUCT LIFE CYCLE<br>SALES PLAN<br>PRICING<br>SALES TEAM<br>SYSTEMS & REPORTING<br>TRAINING & COMP. |

100

| 300 | MAX SCORE | WEIGHT-ING | "X" FOR SCORE | SCORE |
|---|---|---|---|---|
| COSTING | | | | |
| ASSESSING WHETHER THE COMPANY ACCURATELY KNOWS THE COSTS OF ITS PRODUCT AND SERVICES | 0% | 49  49% | | 0 |
| DESCRIBE THE COMPANY'S COST/ESTIMATING MODELS (CHECK ALL THAT APPLY) | | | | |
| THE COMPANY'S COST/ESTIMATING SYSTEM IS BASED ON ACTUAL COSTS | 12 | | | 0 |
| THE COMPANY'S COST/ESTIMATING SYSTEM IS BASED ON STANDARD COSTS | 11 | | | 0 |
| THE COMPANY'S COST/ESTIMATING SYSTEM UTILIZES ACTIVITY BASED COSTS | 13 | | | 0 |
| THE COMPANY'S COST/ESTIMATING SYSTEM DIFFERENTIATES BETWEEN VARIABLE AND FIXED COSTS | 13 | | | 0 |
| THE COMPANY'S PRODUCT COSTING, BILLS OF MATERIAL AND ROUTINGS ARE: (CHECK ALL THAT APPLY) | 0% | 15  15% | | 0 |
| UPDATED AS THEY CHANGE (REAL TIME) AND ARE SUBSTANTIALLY ACCURATE | 15 | | | 0 |
| UPDATED AT SCHEDULED INTERVALS AND ARE SUBSTANTIALLY ACCURATE | 10 | | | 0 |
| NOT UPDATED REGULARLY OR NOT SUBSTANTIALLY ACCURATE | 0 | | | |
| DESCRIBE HOW THE COMPANY DEALS WITH LABOR, OVERHEAD AND MATERIAL VARIANCES (CHECK ALL THAT APPLY) | 0% | 36  36% | | 0 |
| MATERIAL PRICE VARIANCES ARE ANALYZED, AND SUBSTANTIALLY ALLOCATED BACK TO THE CUSTOMER AND PRODUCT | 9 | | | 0 |
| LABOR VARIANCES ARE ANALYZED, AND SUBSTANTIALLY ALLOCATED BACK TO THE CUSTOMER AND PRODUCT | 9 | | | 0 |
| MATERIAL YIELD VARIANCES ARE ANALYZED, AND SUBSTANTIALLY ALLOCATED BACK TO THE CUSTOMER AND PRODUCT | 9 | | | 0 |
| OVERHEAD VARIANCES ARE ANALYZED AND WHERE APPROPRIATE, TRIGGER ADJUSTMENT TO THE COSTING MODEL | 9 | | | 0 |
| | 0% | 100 | | 0 |
| FINANCIAL MANAGEMENT | | | | |
| ENSURING THE COMPANY MANAGES ITS ASSETS TO OPTIMIZE PROFITABILITY AND CASH FLOW | 0% | 28  28% | | 0 |
| DESCRIBE THE COMPANY'S CREDIT AND COLLECTION POLICIES (CHECK ALL THAT APPLY) | | | | |
| THE COMPANY HAS A WRITTEN CREDIT POLICY | 7 | | | 0 |
| THE COMPANY'S CREDIT POLICY IS RELEVANT, APPROPRIATE AND CONSISTENTLY ENFORCED | 7 | | | 0 |
| THE CREDIT DEPARTMENT'S DECISIONS ARE RARELY OVERTURNED BY OTHER EMPLOYEES OR MANAGERS | 7 | | | 0 |
| THE COMPANY'S ACCOUNTS RECEIVABLES BALANCES ARE REVIEWED AND PAST DUE BALANCES ARE AGGRESSIVELY COLLECTED | 7 | | | 0 |
| DAYS SALES OUTSTANDING (DSO) (CHECK ALL THAT APPLY) | 0% | 12  12% | | 0 |
| THE COMPANY MEASURES AND TRACKS DSO | 6 | | | 0 |
| THE COMPANY'S DSO IS DECREASING | 6 | | | 0 |
| THE COMPANY'S DSO IS INCREASING | 0 | | | |
| THE COMPANY'S DSO IS STABLE | 0 | | | |
| INVENTORY MANAGEMENT | | | | |
| HOW DOES THE COMPANY MANAGE INVENTORY? (CHECK ALL THAT APPLY) | 0% | 42  42% | | 0 |
| GROSS MARGIN AND/OR RETURN ON INVESTMENT BY SKU IS TRACKED | 5 | | | |

| STRATEGY & VISION S | % | ORGANIZATION & CULTURE O | % | ACCOUNTING & FINANCE A | % | RESPONSIVENESS & EXECUTION R | % |
|---|---|---|---|---|---|---|---|
| CURRENT VISION & STRATEGIC PLAN 205 | 44% | WORK ENVIRONMENT 225 | 62% | ACCOUNTING & CASH 245 | 60% | RESPONSIVENESS 265 | 55% |
| DOWNHILL RIDES 210 | 60% | EMPOWERMENT, TEAMWORK & CULTURE 230 | 47% | COSTING 250 | 51% | IMPLEMENTATION OF PLANNING & GOALS 270 | 39% |
| REASONS TO THRIVE 215 | 79% | EFFECTIVE HIRING AND TRAINING 235 | 38% | FINANCIAL MANAGEMENT 255 | 19% | CONTINUOUS IMPROVEMENT 275 | 44% |
| SEGMENT FOCUS 220 | 19% | PERFORMANCE APPRAISAL & ACCOUNTABILITY 240 | 25% | SYSTEMS & CONTROLS 260 | 91% | SALES & MARKETING 280 | 58% |
| TOTAL "S" SCORE | 51% | TOTAL "O" SCORE | 43% | TOTAL "A" SCORE | 55% | TOTAL "R" SCORE | 49% |

TOTAL SOAR SCORE  50%

METHOD FOR MEASURING AND IMPROVING ORGANIZATION EFFECTIVENESS

CROSS-REFERENCE TO RELATED APPLICATIONS/INCORPORATION BY REFERENCE

This U.S. patent application claims priority to and the benefit of Provisional U.S. Patent Application Ser. No. 60/793,571 filed on Apr. 20, 2006, which is incorporated herein by reference in its entirety.

TECHNICAL FIELD

Certain embodiments of the present invention relate to business consulting. More particularly, certain embodiments of the present invention relate to a method of evaluating the effectiveness of an organization with respect to certain categories of strategic excellence, and improving processes and procedures within the organization to improve the effectiveness of the organization.

BACKGROUND OF THE INVENTION

Business consulting is a diverse and dynamic field. Consulting procedures exist for a wide range of business types and activities. For example, consulting activities for companies in manufacturing industries can differ greatly from consulting activities for companies in service industries. For companies in manufacturing industries, a business consultant may employ analytical methods and tools that are focused on manufacturing and shipping cost control or product quality improvement. For service industry companies, a consultant may use analytical methods and tools that are focused on employee retention and customer satisfaction. Although some methods and tools are industry- or company-specific, some core analytic methods and tools can be applied across a wide range of business activities, either with or without adaptation.

Generally, many business analytic tools are financial analysis tools. Such tools allow a business consultant or a manager of a business to determine from where a business entity receives its income and to what uses the business places its financial assets. These tools have the advantage of being able to be employed across a wide range of business activities because use of these tools depends on a common language of business, namely finance and accounting. However, in many instances, these tools are poorly suited for the task of identifying operational areas of a business that can be more effectively managed to help the business become more successful.

Current analytic methods and tools for business consulting often focus on financial performance to the exclusion of other important operational characteristics like the culture of the business or how the business responds to marketplace forces. Businesses are dynamic entities that interact with other entities in business environments. Businesses ordinarily react to marketplace forces and sometimes set those forces in motion in the first place. By acting or reacting effectively, a business can succeed in the marketplace and thrive as a viable entity.

Many traditional consulting processes for assessing an organization can take several weeks because they include many non-value added activities which take a lot of time. Such processes do not focus well enough on those activities that truly result in the recommendation of effective solutions to improve the performance of an organization. Other consulting processes and systems are too focused on gathering information in an efficient and timely manner and totally eliminate the value that can be gained by having people within the organization interact with each other as part of the assessment process.

U.S. Pat. No. 6,556,974 to D'Alessandro describes a system for providing accurate, quantifiable and reproducible assessments of an organization's performance based on determined criteria. The system includes a telecommunications infrastructure administered by a survey administrator. Employees and non-employees of a company or other organization to be evaluated log on to the system and answer a plurality of questions relating to various aspects of the business entity's operations. The information may be obtained through Internet communications, through touch-tone telephone systems, and in many other ways including the use of personal computers, diskettes and email, or even manually including the use of pencil and paper where penciled-in answers are read by a scanner. The data is stored in a database and subsequently analyzed by the survey administrator for evaluation and forecasting of the business entity's performance. A web server embodiment is remotely accessible and provides the opportunity to quickly and efficiently gather information and may be available 24 hours per day for employee or non-employees to log on and respond to questions. A complete assessment of a large corporation may be completed more rapidly and efficiently than using independent consultants that interview onsite. Employees of the business are provided with the opportunity to submit honest and candid answers to potentially sensitive questions.

However, the approach described in U.S. Pat. No. 6,556,974 tends not to facilitate interaction between employees as part of the assessment process. U.S. Pat. No. 6,556,974 seems to sacrifice the value that can come from team interaction for efficiency, accuracy, and convenience in gathering information.

Further limitations and disadvantages of conventional, traditional, and proposed approaches will become apparent to one of skill in the art, through comparison of such systems and methods with the present invention as set forth in the remainder of the present application with reference to the drawings.

BRIEF SUMMARY OF THE INVENTION

An embodiment of the present invention comprises a method of evaluating organization effectiveness. The method includes making a presentation, as part of a one-day event, to a group of individual persons associated with an organization who have been previously selected (e.g., in advance of the one-day event) to be participants in the one-day event. The presentation describes and explains the various aspects of the one-day event. The method also includes engaging the participants in at least one team-building exercise as part of the one-day event to demonstrate advantages of teamwork to the participants. The method further includes the participants generating a set of responses to a set of organizational statements as part of the one-day event. The method also includes entering at least a portion of the set of responses into a software program running on a computer-based platform and having the software program operate on the input set of responses to generate output results, as part of the one-day event. However, in general, the entire set of responses is entered into the software program.

In accordance with an embodiment of the present invention, the set of organizational statements is organized into four categories of organizational statements including a first category related to strategic aspects and vision aspects of the organization, a second category related to organizational aspects and cultural aspects of the organization, a third category related to accounting aspects and financial aspects of the organization, and a fourth category related to responsiveness aspects and execution aspects of the organization. The output results may be used to improve the effectiveness of the organization by implementing certain actions within the organization in response to the output results.

Another embodiment of the present invention comprises a method of evaluating organizational effectiveness. The method includes making a presentation, as part of a one-day event, to a group of individual persons associated with an organization who have been previously selected to be participants in the one-day event. The presentation describes and explains the various aspects of the one-day event. The method also includes engaging the participants in at least one team-building exercise as part of the one-day event to demonstrate advantages of teamwork to the participants. The method further includes separating the participants into at least two brainstorming sub-teams as part of the one-day event and having each of the sub-teams separately generating, through a brainstorming process, first responses to a first category of organizational statements. The method also includes entering the first responses from each of the sub-teams into a software program running on a computer-based platform as part of the one-day event. The method further includes the sub-teams coming back together as a single group of participants to discuss and modify the first responses in order to generate a first consensus of responses, as part of the one-day event, and the first consensus of responses are entered into the software program running on the computer-based platform.

Other categories of organizational statements may also be considered and responded to by the participants as part of the one-day event and entered into the software program. The software program operates on the responses and generates a plurality of evaluation results as part of the one-day event.

Most elements of the method described herein, in accordance with an embodiment of the present invention, are designed to be completed in a one-day facilitated event. The one-day event is an action-packed day of discussion, brainstorming and teamwork using uniquely designed evaluation processes as later described herein. At the end of the one-day event, the participants receive an overall assessment of the organization based on the plurality of evaluation results (e.g., scores for all categories evaluated) and an overview of the business improvement opportunities available to the organization.

The method, in accordance with an embodiment of the present invention, allows an organization to rapidly compare and benchmark themselves against the best performers while still taking advantage of the value of team interaction, and then develop plans to take advantage of unique and highly effective improvement opportunities such as, for example, profit and cash flow improvement opportunities.

These and other advantages and novel features of the present invention, as well as details of illustrated embodiments thereof, will be more fully understood from the following description and drawings.

BRIEF DESCRIPTION OF SEVERAL VIEWS OF THE DRAWINGS

FIG. 2 is an exemplary chart illustrating the various organizational categories and subcategories that are evaluated using the method of FIG. 1, in accordance with an embodiment of the present invention.

FIG. 3 is an exemplary chart illustrating a subset of statements corresponding to a certain category and subcategories of FIG. 2 and which are evaluated using the method of FIG. 1, in accordance with an embodiment of the present invention.

FIG. 4 is an exemplary chart illustrating a plurality or scored results, generated using the method of FIG. 1, with respect to the categories and subcategories of FIG. 2, in accordance with an embodiment of the present invention.

Figure 1:
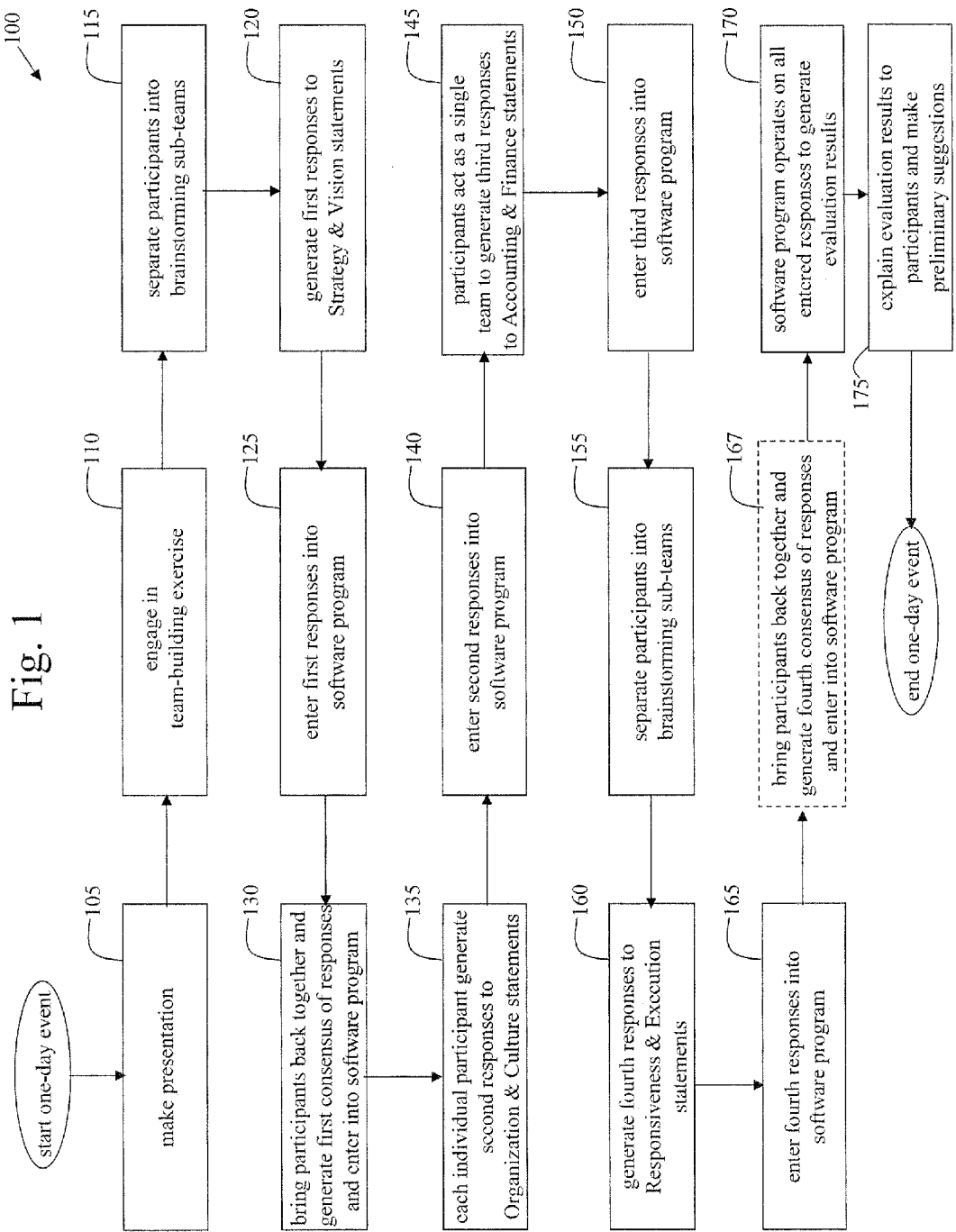
FIG. 1 is a flowchart of an embodiment of a method of evaluating organizational effectiveness as part of a one-day event, in accordance with various aspects of the present invention.

DETAILED DESCRIPTION OF THE INVENTION in general, as used herein, the term "one-day event" refers to activities that, for the most part, can be completed in one business day (e.g., an 8-hour period of time, or less than 24 hours). However, some activities associated with the one-day event may not actually be performed until a next second day, in some instances. Therefore, the term "one-day event" is not intended to be overly restrictive to a contiguous 24-hour period associated with a specific date. The one-day event may actually overlap into a second contiguous day, or may be broken up into smaller pieces that are carried out over several contiguous or non-contiguous days, for example. However, it is clear that clients would like the event to happen in one business day (e.g., in less than 10 contiguous hours)

FIG. 1 is a flowchart of an embodiment of a method 100 of evaluating organizational effectiveness as part of a one-day event, in accordance with various aspects of the present invention. In step 105, a presentation is made to a group of individual persons associated with an organization who have been previously selected to be participants in the one-day event. The presentation describes and explains various aspects of the one-day event to the participants and is typically given by a certified consultant (i.e., a consultant who is certified in the method 100). In accordance with an embodiment of the present invention, giving said selected participants a document in advance of said one-day event, a document describing the one-day event may be provided to the participants such that said selected participants may review the document before said one-day event.

The organization may be, for example, a business, a company, a for-profit business, a not-for-profit business, or any other type of organization. The individual persons may be employees of the organization, consultants to the organization, customers or clients of the organization, suppliers to the organization, or anyone else somehow associated with and having some knowledge about the organization.

In step 110, the participants engage in at least one team-building exercise, typically orchestrated by the certified consultant, to demonstrate the advantages of teamwork to the participants. As an example, the team building exercise may involve the participants solving a puzzle together.

In step 115, the participants are separated into at least two brainstorming sub-teams. For example, the participants may be separated into three distinct sub-teams, each sub-team being a mixture of employees and non-employees managers and non-managers. In step 120, each of the brainstorming sub-teams separately generate, via a brainstorming process, first responses to a first category of organizational statements.

In accordance with an embodiment of the present invention, the first category of statements to be responded to by the participants is that of "Strategy & Vision". This first category is concerned with the relationship of the organization to other organizations in the marketplace and other factors that are external to the organization. FIG. 2 is an exemplary chart 200 illustrating the various organizational categories and subcategories that are evaluated using the method 100 of FIG. 1, in accordance with an embodiment of the present invention. Under the category "Strategy & Vision" 201 are four sub-categories including "Current Vision & Strategic Plan" 205, "Downhill Rides" 210, "Reasons to Thrive" 215, and "Segment Focus" 220.

The sub-category "Current Vision & Strategic Plan" 205 includes components that are concerned with long-range planning objectives of an organization. Among the components of sub-category 205 are "current vision and strategic plan of an organization", buy-in of various stakeholders to the strategy and vision of the organization", "customer input" as such input affects the strategy and vision of the organization, and "focus of the company on its strategy and vision". For each component, a set of statements have been developed which the participants are to respond to in step 120 of the method 100. An exemplary statement for the component "customer input" might be "Our organization collects information from customers on their needs but with little or no action". In accordance with alternative embodiments of the present invention, instead of statements, the query mechanism may be in the form of questions or some other response-triggering mechanism.

In accordance with an embodiment of the present invention, the participants do not assign points to statements or make judgments with respect to statements such as "strongly agree". Instead, the participants respond to the statements as either "yes" by, for example, marking an "X" in an appropriate column of a response sheet, "no" by not making a mark of any kind, or "not applicable" by marking, for example, "N/A". The responses are entered into a software program and the software program automatically assigns points based on the input responses, using a pre-determined point system. Some statements allow only one answer and the participants are instructed to mark the answer that best applies. Some other statements allow more than one answer and the participants are instructed to mark all that apply.

In accordance with an alternative embodiment of the present invention, the participants may respond to such a statement by assigning a score or ranking value of agreement to the statement themselves, for example, by point allocation. One possible way of allocating points includes assigning a ranking value of agreement to a statement. For example, the possible ranking values of agreement may be from 1 to 8 where the value 1 corresponds to strongly disagree and the value 8 corresponds to totally agree. Another possible way of allocating points includes distributing a number of points across a subset of statements within a component of a sub-category. For example, a total of 16 points may be distributed by the participants across the statements associated with one of the four components of the sub-category 205 of the category 201, in accordance with an embodiment of the present invention. The statement that is most strongly agreed with is allocated the most points of the 16 total points to be allocated, and the other statements are allocated lesser points of the 16 total points to be allocated.

The sub-category "Downhill Rides" 210 includes components that are concerned with external factors that can negatively affect the organization. Among the components of this sub-category are "market growth", "market leverage", "market stability", and "margins". The participants may respond to the statements associated with these components in a manner similar to one of the scoring procedures described above.

The sub-category "Reasons to Thrive" 215 includes components that are associated with factors that affect how an organization acts or reacts in the marketplace. Among the components of this sub-category are "pricing", "customer service", "quality", "technology and innovation", "ease of doing business", and "intangibles". The participants may respond to the statements associated with these components in a manner similar to one of the scoring procedures described above.

The sub-category "Segment Focus" 220 includes components that are concerned with factors that affect the organization within its market segment. Among the components of this sub-category are "analyze and act", "sales strategy", "growth strategy", "protection strategy", and "market share". The participants may respond to the statements associated with these components in a manner similar to one of the scoring procedures described above.

Referring again to FIG. 1, in step 125, the first responses given for the various statements of the first category 201 "Strategy & Vision" are entered into a software program running on a computer-based platform such as, for example, a personal computer (PC). The software program is capable of reading the input responses, processing the responses, and generating output results based on the processing of the responses. In accordance with an embodiment of the present invention, the software program compares answers of the sub-teams and identifies areas of agreement and disagreement. Other possible examples of computer-based platforms or processor-based platforms that may be used in accordance with various embodiments of the present invention include a work station, a laptop, a customized processor-based platform, a hand-held data entry device, or any other type of computer- or processor-based platform capable of having data entered therein, processing the data according to a software program, and outputting results of the processing.

In step 130, the sub-teams of participants are brought back together as a single group to discuss and possibly modify the first responses in order to come to a consensus and generate a first consensus of responses. Where the sub-teams disagree, a consultant may function as a facilitator to help the sub-teams review and analyze their responses to achieve consensus. The first consensus of responses are then entered into the software program of the computer-based platform. In accordance with an embodiment of the present invention, the software program may now operate on the first consensus of responses to generate first category results corresponding to the "Strategy & Vision" category 201. That is, the software program is capable of operating on the responses to generate first category results as part of the one-day event. Alternatively, other responses may be collected for other categories before the software program operates on any of the responses. As an alternative, only the first consensus of responses are entered into the software program. The first responses from each separate brain storming sub-team are not entered.

In step 135, each of the participants, as individuals, generate second responses to a second category of organizational statements as part of the one-day event.

In accordance with an embodiment of the present invention, the second category of statements to be responded to by the participants is that of "Organization & Culture". This second category is concerned with factors that are internal to the organization. Specifically, those factors are related to the structure of the organization and the operation of the organization within that structure. Referring again to FIG. 2, under the category "Organization & Culture" 202 are four sub-categories including "Work Environment" 225, "Empowerment, Teamwork & Culture" 230. "Effective Hiring, Training & Development" 235, and "Performance Appraisal & Accountability" 240.

The sub-category "Work Environment" 225 includes components that are concerned with "communications among people in the organization", "leadership of managers", and "the physical working environment". Again, for each component, a set of statements have been developed which the participants are to respond to in step 135 of the method 100. An exemplary statement for the component "physical working environment" might be "The workplace is safe and secure (inside and out)".

The sub-category "Empowerment, Teamwork & Culture" 230 is associated with various attributes of employment at the organization from the employee perspective. Specific components in this sub-category include "employee input", "teams", "empowerment", and "culture". Again, for each component, a set of statements have been developed which the participants are to respond to in step 135 of the method 100. An exemplary statement for the component "teams" might be "Our company uses cross-functional teams whenever applicable".

The sub-category "Effective Hiring, Training & Development" 235 is related to various attributes of employment at the organization from the employer perspective. Specific components in this sub-category include "hiring", "training", "cross-training", "employee turnover", and "succession planning". Again, for each component, a set of statements have been developed which the participants are to respond to in step 135 of the method 100. An exemplary statement for the component "training" might be "Our company has a comprehensive and graduated training program".

The sub-category "Performance Appraisal & Accountability" 240 is related to activities that evaluate other business activities, evaluate responsibility for activities, and link finances to activities. Specific components in this sub-category include "appraisal system", "accountability", and "financial link". Again, for each component, a set of statements have been developed which the participants are to respond to in step 135 of the method 100. An exemplary statement for the component "financial link" might be "Employee compensation is tied to the attainment of goals and objectives".

Referring again to FIG. 1, in step 140, the second responses given for the various statements of the second category 202 "Organization & Culture" are entered into the software program running on the computer-based platform such as, for example, a personal computer (PC). The software program is capable of reading the input responses, processing the responses, and generating output results based on the processing of the responses.

In accordance with an embodiment of the present invention, the software program may now operate on the second responses to generate second category results corresponding to the "Organization & Culture" category 202. Alternatively, other responses may be collected for other categories before the software program operates on any of the responses.

In step 145, the participants come together to act as a single brainstorming group and to generate third responses to a third category of organizational statements as part of the one-day event.

In accordance with an embodiment of the present invention, the third category of statements to be responded to by the participants is that of "Accounting & Finance". This third category is concerned with financial management of the organization. Financial management factors can include management of cash outflows, such as outflows through purchases, as well as cash inflows, such as collections of accounts receivable. Also included are financial planning factors such as budgeting and risk management Referring again to FIG. 2, under the category "Accounting & Finance" 203 are four sub-categories including "Accounting & Cash" 245, "Costing" 250, "Financial Management" 255, and "Systems & Controls" 260. FIG. 3 is an exemplary chart 300 illustrating a subset of statements corresponding to a certain category 203 (Accounting & Finance) and subcategories of FIG. 2 and which are evaluated using the method 100 of FIG. 1, in accordance with an embodiment of the present invention. The format of the chart 300 is designed to collect responses and assess relevant information.

The sub-category "Accounting & Cash" 245 is related to traditional financial tools. Components include "financial statements", "budgets and variances", "projections", "capital & cash", and "covenants". Again, for each component, a set of statements have been developed which the participants are to respond to in step 145 of the method 100. An exemplary statement for the component "financial statements" might be "Financial statements are generally considered very accurate when initially issued".

The sub-category "Costing" 250 is associated with fees imposed on the organization during its operations. Specific components in this sub-category include "costing", "bills of material", "cost variances", and "break-even/contrib . . . levels". Again, for each component, a set of statements have been developed which the participants are to respond to in step 145 of the method 100. An exemplary statement for the component "bills of material" might be "The company's bills of material are updated as they change in real time and are substantially accurate".

The sub-category "Financial Management" 255 is related to control and use of financial resources of the organization, including how the organization extends and uses credit and generally uses its assets. Specific components in this sub-category include "credit & collection", "DSO", "inventory", and "fixed assets". Again, for each component, a set of statements have been developed which the participants are to respond to in step 145 of the method 100. An exemplary statement for the component "inventory" might be "Days in inventory or inventory turns are tracked".

The sub-category "Systems & Controls" 260 is concerned with how the organization tracks its finances. Specific components in this sub-category include "information technology (IT)", "internal controls", "risk management", and "safety". Again, for each component, a set of statements have been developed which the participants are to respond to in step 145 of the method 100. An exemplary statement for the component "safety" might be "The company has a comprehensive, written and enforced safety program".

Referring again to FIG. 1, in step 150, the third responses given for the various statements of the third category 203 "Accounting & Finance" are entered into the software program running on the computer-based platform such as, for example, a personal computer (PC). As an option, where the individuals disagree, a consultant may function as a facilitator to help the individuals review and analyze their responses to achieve consensus. The consensus of responses are then entered into the software program of the computer-based platform. The software program is capable of reading the input responses, processing the responses, and generating output results based on the processing of the responses.

In accordance with an embodiment of the present invention, the software program may now operate on the third responses to generate third category results corresponding to the "Accounting & Finance" category 203. Alternatively, other responses may be collected for other categories before the software program operates on any of the responses.

In steps 155-160, the participants are again separated into at least two brainstorming sub-teams and each of the at least two brainstorming sub-teams generate, through a brainstorming process, fourth responses to a fourth category of organizational statements as part of the one-day event.

In accordance with an embodiment of the present invention, the fourth category of statements to be responded to by the participants is that of "Responsiveness & Execution". This fourth category is related to how the organization interacts with external environmental factors. These external environmental factors can be associated with customers, suppliers, or other relevant entities. Referring again to FIG. 2, under the category "Responsiveness & Execution" 204 are four sub-categories including "Responsiveness" 265, "Implementation of Planning & Goals" 270, "Continuous Improvement/Lean" 275, and "Sales & Marketing" 280.

The sub-category "Responsiveness" 265 is associated with how the organization reacts to external stimuli. Components include "delivery and fill", "resolving issues", "customer involvement", and "relationship with customers". Again, for each component, a set of statements have been developed which the participants are to respond to in step 160 of the method 100. An exemplary statement for the component "delivery and fill" might be "Our company measures on-time delivery (delivering the order when the customer wants it".

The sub-category "Implementation of Planning & Goals" 270 is related to efforts of an organization to perpetuate its survival in the marketplace. Specific components in this sub-category include "goals and planning", "execution", and "KPI's". Again, for each component, a set of statements have been developed which the participants are to respond to in step 160 of the method 100. An exemplary statement for the component "KPI's" might be "We have identified the key drivers of the company's success that represent the most important indicators of the company's success".

The sub-category "Continuous Improvement/Lean" 275 is related to efforts by the organization to improve its internal processes as well as its products or services. Specific components in this sub-category include "lean", "scheduling and flow", "quality", "supplier accountability", "controlling costs", and "logistics". Again, for each component, a set of statements have been developed which the participants are to respond to in step 160 of the method 100. An exemplary statement for the component "lean" might be "Our company knows and actively monitors key process cycle times".

The sub-category "Sales & Marketing" 280 is concerned with efforts by the organization to promote its products and services in the marketplace. Specific components in this sub-category include "value proposition", "product life cycle", "sales plan", "pricing", "sales team", "systems and reporting", and "training and compensation". Again, for each component, a set of statements have been developed which the participants are to respond to in step 160 of the method 100. An exemplary statement for the component "sales team" might be "Our sales team works as a cohesive and motivated team".

Referring again to FIG. 1, in step 165, the fourth responses given for the various statements of the fourth category 204 "Responsiveness & Execution" are entered into the software program running on the computer-based platform such as, for example, a personal computer (PC). As an option, where the sub-teams disagree, a consultant may function as a facilitator to help the sub-teams review and analyze their responses to achieve consensus. The consensus of responses are then entered into the software program of the computer-based platform. The software program is capable of reading the input responses, processing the responses, and generating output results based on the processing of the responses. As an alternative, only the fourth consensus of responses are entered into the software program. The fourth responses from each separate brain storming sub-team are not entered.

In accordance with an embodiment of the present invention, the software program may now operate on the fourth responses to generate fourth category results corresponding to the "Responsiveness & Execution" category 204. In accordance with another embodiment of the present invention, referring again to FIG. 1, the software program may now operate on all responses from the first, second, third, and fourth categories to generate a plurality of evaluation results (a full set of output results) as part of the one-day event.

In step 175, the plurality of evaluation results are explained to the participants as part of the one-day event. For example, the plurality of evaluation results may be displayed on a display to the participants as the results are being explained. A set of preliminary suggestions may be generated in response to the plurality of evaluation results and presented to the participants. The preliminary suggestions may include potential future actions that may be taken by the organization which may result in improving the evaluation results. In accordance with an embodiment of the present invention, the software program may automatically suggest assessment and improvement comments to help the consultant explaining the results and suggestions.

Sometime after the one-day event, a formal report may be generated in response to the plurality of evaluation results. The formal report identifies the strengths and weaknesses of the organization and details possible future corrective actions that may be taken by the organization to improve the evaluation results as well as to improve, for example, profitability and cash flow of the organization. The formal report is provided to the participants. In accordance with an embodiment of the present invention, the formal report may, at least initially, be automatically written by the software program to help the consultant.

The formal report may be reviewed with the participants to identify definite future corrective actions to be taken by the organization to improve the evaluation results as well as to improve, for example, profitability and cash flow of the organization.

After the identified future actions have been implemented, the organizational effectiveness of the organization may be re-evaluated by repeating at least a portion of the method steps of the method 100, typically after a defined period of time after the identified future actions have been implemented.

Selection of a participant is typically based upon the individual's knowledge or familiarity with at least one feature of the subject organization. Although some individuals may have a great many years of experience in an industry or with the subject organization, relative newcomers may also be selected as participants. One desirable attribute of the group of selected participants is that the group include a minimum number of participants. Although the exact number can vary according to specific circumstances, a group with a sufficient number of participants to provide some diversity and range of viewpoints is desirable. In many instances, a group of between six to twelve participants is sufficient.

Responses to specific statements can be tracked and scored using a scoring system, in accordance with an embodiment of the present invention. In the examples presented herein, many of the responses to the statements can be given in a yes/no format, a number from among a range of numbers along a continuum, a percentage, or some other response format that either is numeric or can be given a numeric representative value using a conversion chart, lookup table, or similar device. Such response formats can facilitate direct inclusion of responses into a scoring system.

In accordance with an embodiment of the present invention, the scoring system is incorporated into a computer-implemented tool to aid in mathematical calculations and organization of the data. One possible implementation is with a spreadsheet. A dedicated program can also be created. Such a dedicated program can use a variety of interfaces, including a graphical user interface, a command line, or a hypertext markup language (HTML) or web-based interface, among others, for example.

The scoring system presented herein is one possible example of a suitable scoring system that can be used. In this exemplary scoring system, layered weighted averages are used, with results presented as percentages. In such a system, each subcategory is given its own score, with a maximum score of one hundred percent for each subcategory. Scores for the subcategories in each category can be aggregated to yield a percentage score for each category. Percentage scores for each category can themselves be aggregated to yield an overall percentage score.

When such a scoring method and response gathering system is used with a group of participants, the members of the group can be called upon to come to a consensus to provide a single response for each statement being responded to. Responses from each individual participant can also be used and aggregated to calculate a single entry for use in scoring. In such a case, individual responses can be given equal weight or a weighting factor can be applied to account for such things such as knowledge or experience with the subject organization or within a relevant industry. Other weighting factors can be applied.

Subgroups (sub-teams) of the participant group can also be used. When subgroups are used, participants in each subgroup can be asked to come to a consensus response or the individual response aggregation system described herein can be used to formulate a group response. As with a single group, individual responses can be given appropriate weightings. Scores for each subgroup can be aggregated to arrive at a final score for the whole.

Scoring results may be color coded in a presentation format to highlight ranges of scores. For a score in a range considered to be poor, a red coloring can be applied to the score or an area surrounding the score. For a score in a range considered to represent areas needing improvement, a yellow color can be applied. For a score that falls in a range considered to be good, a green color can be applied. Specifics of ranges can be adjusted to suit particular situations and other colors or combinations of colors, including white, black, or no coloring, can be used.

In accordance with certain embodiments of the present invention, point allocations are made directly by the participants when responding to a statement, or by the software program after participant responses are entered. One possible way of allocating points is to award points, up to a pre-selected maximum, among various components in a group. Another possible way is to pre-select point values for various components and have a pre-selected point value be awarded when a participant indicates that a response is associated with a particular component. For example, if an area of statements includes multiple components that can be described by a range of values where a participant can indicate that the response strongly or weakly matches the statement (or that the participant strongly or weakly agrees or disagrees with a statement) then the participants can directly allocate points. In another example, when an area of statements includes multiple mutually-exclusive categories from which a participant must select a single response, a simple selection can be used with a pre-selected point award for the selection. Combinations or variations of these approaches can also be used, in accordance with various embodiments of the present invention.

For example, within the "Strategy & Vision" category 201, responses may be gathered for each subcategory 205-220. In the first subcategory 205, "Current Vision & Strategic Plan", responses are gathered regarding the organization's strategic plan. For the first component, also called "current vision and strategic plan", on a scale from zero to eight, values are automatically assigned that represent a degree to which the participants agree with statements that describe strategic planning efforts. A maximum score for this subcategory is forty points with a corresponding weight of forty percent. However, other maximum scores and weightings are possible as well, for this and all other components described herein.

For the second component, "buy-in", the statements to be responded to refer to a degree to which employees and others in the organization have adopted the vision and strategic plan of the organization. A maximum score for this component is sixteen points with a corresponding weight of sixteen percent. The sixteen points available for this subcategory may be distributed among three possibilities.

The third component, "customer input", also has a maximum score of sixteen with a corresponding weight of sixteen percent, in accordance with an embodiment of the present invention. The sixteen points can be distributed among three possibilities according to strength of agreement with each possibility.

The fourth component, "focus", includes a total of twenty-eight points and a corresponding weight of twenty-eight percent, in accordance with an embodiment of the present invention. Four areas each can be allocated points on a scale ranging from zero to seven, indicating strength of agreement with statements from each area.

Scores from each area are aggregated to calculate a score for the first subcategory 205. This score may be expressed as a percentage using the weightings described. Additionally, the score can be color-coded to indicate that the score falls within a particular range and associate that range with a quality such as good, fair, or poor performance in the scored area.

The second subcategory 210 of the category 201 is "Downhill Rides". In this subcategory, up to three product lines are identified and a percentage of the sales assigned to each. These percentages can be used to weight responses to statements. For statements in this subcategory, responses can be given for each identified product line.

The first component, "market growth", has a maximum score of thirty-two points with a corresponding weighting of thirty-two percent. The thirty-two available points can be distributed among five areas. For the remainder of this disclosure, as with previous examples and to avoid repetition, whenever a distribution of points is discussed, such distribution can be assumed to be in accordance with a scale that describes strength of agreement with, or correctness of, a statement. It should also be noted that in this example, as well as with those examples that both precede and follow, when there is some number of points to be allocated in a scoring system, it is not necessary for all points to be allocated, even though they could be. Similarly, awarding points can include awarding zero points.

The next component, "market leverage", is related to evaluating qualities of the marketplace within which the organization operates. This component has a maximum of twenty points and a corresponding weighting of twenty percent. The third component, "market stability", is related to stability of the market within which the organization operates. This component has a total of thirty-two points with an associated weighting of thirty-two percent. Eight areas of inquiry may be included in this component and assigned a score, in accordance with an embodiment of the present invention. The fourth component of the subcategory 210 is, "margins", and is related to information about gross margins in the marketplace. This component has a maximum of sixteen points with an associated weighting of sixteen points.

The third subcategory 215, "Reasons to Thrive", of the category 201 has a maximum score for the subcategory of 100 points. Components of this subcategory are directed toward assessing whether the organization has strengths that differentiate it from its competitors and which enhance customer satisfaction. Responses to statements for each of the components in this subcategory are made with respect to each of the previously-identified product lines, as described above herein. Weightings are as also described above herein.

The first component, "pricing", is related to the organization's current market pricing. This component has a maximum of seventeen points available and a corresponding weight of seventeen percent. The second component, "customer service", is associated with the view the marketplace has of the organization's customer service. This component has a maximum of eighteen points available and a corresponding weight of eighteen percent. The third component, "quality", pertains to the organization's efforts to establish or maintain quality of its products or services. This quality component has a maximum of seventeen points available with a corresponding weighting of seventeen percent. The fourth component, "technology and innovation", relates to the organization's use of technology an innovation it its provision of goods and services. This component has sixteen points available with a corresponding weighting of sixteen percent. The fifth component, "ease of doing business", is associated with perceived ease of doing business with the organization. This component has a maximum of sixteen available points and a corresponding weighting of sixteen percent. The sixth component, "intangibles", is related to intangible qualities of the organization, such as the organization's reputation, style, feel, image, or look in the marketplace. This component has a maximum of sixteen available points and a corresponding weighting of sixteen percent.

The fourth subcategory 220, "Segment Focus", of the category 201 deals with the organization's focus on segments that are most profitable. This subcategory has a maximum point allocation of one hundred points. Responses to statements for each component in this subcategory are made with respect to each of the previously identified product lines, as described above herein. Weightings are also as described above herein.

The first component, "analyze and act", is concerned with the organization's financial information gathering and analysis and its reaction to that analysis. This component has a maximum of sixty points that can be awarded, with a corresponding weighting of sixty percent. The second component, "sales strategy", refers to the organization's sales strategy and has a maximum of sixteen points that can be awarded with a corresponding weighting of sixteen percent. The third component, "growth strategy", has a maximum of twelve available points and a weighting of twelve percent. The fourth component, "protection strategy", relates to the organization's strategy to protect its major customers from attacks by competitors. This component has a maximum of twelve available points and a weighting of twelve percent. In accordance with an alternative embodiment of the present invention, a fifth component, "market share", may be included which relates to the percentage of total industry sales that is made up by the organization's individual sales.

The remaining three categories 202, 203, and 204 may be approached in much the same way as the first category 201 for purposes of scoring. Each category will have its unique subcategories and components, however.

For each component in a subcategory, points awarded to each statement are appropriately weighted and a component score is calculated by summing the weighted scores for each statement of the associated component. The component score can be color-coded as previously described. For each subcategory, a subcategory score is calculated by summing the individual component scores. Each of the subcategory scores can be color-coded as well. The subcategory scores can be summed to calculate a category score. The category score, as with other scores described in these examples, can be expressed as a raw score or as a percentage, among other possibilities, in accordance with various embodiments of the present invention. Additionally, the category score can be color-coded. Each category score can be summed to calculate an overall total score. The overall total score can be expressed as a raw score or as a percentage. The overall total score can be color-coded as well.

For example, FIG. 4 is an exemplary chart 400 illustrating a plurality or scored results, generated using the method 100 of FIG. 1, with respect to the categories and subcategories of FIG. 2, in accordance with an embodiment of the present invention. The scores for each subcategory and category are expressed in percents, as is the total score.

In accordance with other embodiments of the present invention, the scoring system can be modified by, for example, changing the weightings, changing the maximum point allocation, and/or changing the computational methods. Among the changes contemplated are changes in weightings that emphasize components of the overall system that have particular importance within a defined industry. Similarly, weights can be changed to minimize or de-emphasize components that have little or minimal importance within an industry. Particulars of calculations can also be changed to use mathematically similar or equivalent computational formulae.

With respect to the overall framework of the method, including particular components of the framework, additions, deletions, or substitutions, including any combination or these, can be made at any level of granularity to tailor the method to a particular industry or market, for example.

In summary, a method of evaluating the effectiveness of an organization is disclosed. The method is conducted as a one-day event which allows interaction between the participants. The focus of the method is that of gathering responses from the participants to various categories of statements related to various aspects of the organization, and generating evaluation results based on the responses to the statements. The evaluation results are used to generate courses of action that may be taken by the organization to improve the effectiveness of the organization.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of evaluating organization effectiveness, said method comprising:
    making a presentation, as part of a one-day event, wherein said presentation describes said one-day event;
    generating, through at least two brainstorming processes, first responses to a first category of organizational statements as part of said one-day event;
    entering said first responses from each of said at least two brainstorming processes into a software program running on a computer-based platform as part of said one-day event;
    discussing and modifying said first responses in order to generate a first consensus of responses, which are entered into said software program running on said computer-based platform, as part of said one-day event; and
    said software program operating on said first consensus of responses to generate first category results as part of said one-day event, wherein said first category results correspond to one category of the group of categories consisting of: strategy and vision, organization and culture, accounting and finance, and responsiveness and execution.

2. The method of claim 1 wherein said first category of organizational statements corresponds to at least strategic aspects and vision aspects of an organization.

3. The method of claim 1 further comprising providing a document in advance of said one-day event, said document describing said one-day event such that said document may be reviewed before said one-day event to enhance efficiency and effectiveness of said one-day event.

4. The method of claim 1 further comprising:
    generating second responses to a second category of organizational statements as part of said one-day event; and
    entering said second responses into said software program running on said computer-based platform.

5. The method of claim 4 further comprising said software program operating on said second responses to generate second category results as part of said one-day event.

6. The method of claim 4 wherein said second category of organizational statements corresponds to at least organizational aspects and cultural aspects of an organization.

7. The method of claim 4 further comprising:
    employing a single brainstorming process generating third responses to a third category of organizational statements as part of said one-day event; and
    entering said third responses from said single brainstorming process into said software program running on said computer-based platform as part of said one-day event.

8. The method of claim 7 further comprising said software program operating on said third responses to generate third category results as part of said one-day event.

9. The method of claim 7 wherein said third category of organizational statements corresponds to at least accounting aspects and financial aspects of an organization.

10. The method of claim 7 further comprising:
    generating, through at least two brainstorming processes, fourth responses to a fourth category of organizational statements as part of said one-day event; and
    entering said fourth responses from each of said at least two brainstorming processes into said software program running on said computer-based platform as part of said one-day event.

11. The method of claim 10 further comprising said software program operating on said fourth responses to generate fourth category results.

12. The method of claim 10 wherein said fourth category of organizational statements corresponds to at least responsiveness aspects and execution aspects of an organization.

13. The method of claim 10 further comprising said software program operating on said first consensus of responses, said second responses, said third responses, and said fourth responses to generate a plurality of evaluation results as part of said one-day event.

14. The method of claim 13 further comprising displaying and explaining said plurality of evaluation results as part of said one-day event.

15. The method of claim 14 further comprising:
    generating a set of preliminary suggestions, in response to said plurality of evaluation results, of potential future actions that may be taken by said organization which may result in improving said plurality of evaluation results as part of said one-day event; and
    presenting said preliminary suggestions as part of said one-day event.

16. The method of claim 15 further comprising:
    generating a formal report after said one-day event, in response to said plurality of evaluation results, which identifies strengths and weaknesses of said organization and which details possible future actions that may be taken by said organization to improve said plurality of evaluation results as well as to improve profitability and cash flow of said organization; and
    providing said formal report.

17. The method of claim 16 further comprising reviewing said formal report and identifying definite future actions to be taken by said organization to improve said plurality of evaluation results as well as to improve profitability and cash flow of said organization.

18. The method of claim 1 wherein said generating of said first responses includes assigning a ranking value of agreement to each statement of a subset of statements within said first category of organizational statements.

19. The method of claim 1 wherein said generating of said first responses includes distributing a number of points across a subset of statements within said first category of organizational statements.

20. The method of claim 4 wherein said generating of said second responses includes assigning a ranking value of agreement to each statement of a subset of statements within said second category of organizational statements.

21. The method of claim 4 wherein said generating of said second responses includes distributing a number of points across a subset of statements within said second category of organizational statements.

22. The method of claim 7 wherein said generating of said third responses includes assigning a ranking value of agreement to each statement of a subset of statements within said third category of organizational statements.

23. The method of claim 7 wherein said generating of said third responses includes distributing a number of points across a subset of statements within said third category of organizational statements.

24. The method of claim 10 wherein said generating of said fourth responses includes assigning a ranking value of agreement to each statement of a subset of statements within said fourth category of organizational statements.

25. The method of claim 10 wherein said generating of said fourth responses includes distributing a number of points across a subset of statements within said fourth category of organizational statements.

26. The method of claim 17 further comprising implementing said identified definite future actions within said organization.

27. The method of claim 26 further comprising re-evaluating said organizational effectiveness of said organization by repeating the method steps of at least claims 1, 6, 9, 12, 15, and 16 herein after said identified definite future actions have been implemented for a defined period of time.

28. The method of claim 1 wherein said one-day event is accomplished in one 24-hour period of time.

29. The method of claim 1 wherein said one-day event is accomplished in less than 10 contiguous hours.

30. The method of claim 10 further comprising discussing and modifying said fourth responses in order to generate a fourth consensus of responses, which are entered into said software program running on said computer-based platform, as part of said one-day event.

31. The method of claim 1 further comprising engaging in at least one team-building exercise as part of said one-day event to demonstrate advantages of teamwork.

\* \* \* \* \*